United States Patent
Qiu et al.

(10) Patent No.: US 10,212,013 B2
(45) Date of Patent: Feb. 19, 2019

(54) SIGNAL CLIPPING PROCESSING METHOD AND DEVICE

(71) Applicant: Huawei Technologies Co., Ltd., Shenzhen (CN)

(72) Inventors: Jing Qiu, Chengdu (CN); Tingjian Tian, Chengdu (CN); Yunfu Dou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/636,748

(22) Filed: Jun. 29, 2017

(65) Prior Publication Data
US 2017/0302490 A1    Oct. 19, 2017

Related U.S. Application Data

(63) Continuation of application No. PCT/CN2014/095989, filed on Dec. 31, 2014.

(51) Int. Cl.
*H04L 27/26* (2006.01)
*H04W 72/04* (2009.01)

(52) U.S. Cl.
CPC ...... *H04L 27/2623* (2013.01); *H04L 27/2626* (2013.01); *H04W 72/0453* (2013.01); *H04W 72/04* (2013.01)

(58) Field of Classification Search
None
See application file for complete search history.

(56) References Cited

U.S. PATENT DOCUMENTS

| 5,606,578 A * | 2/1997 | O'Dea | H04L 27/3411 375/296 |
| 9,455,860 B2 * | 9/2016 | Feng | H04L 27/2623 |
| 9,485,129 B1 * | 11/2016 | Cope | H04L 27/2623 |
| 9,806,929 B2 * | 10/2017 | Farabegoli | H03F 1/02 |
| 2002/0101935 A1 * | 8/2002 | Wright | H04L 25/03834 375/295 |
| 2004/0052314 A1 * | 3/2004 | Copeland | H04B 1/707 375/296 |

(Continued)

FOREIGN PATENT DOCUMENTS

| CN | 101262256 A | 9/2008 |
| CN | 101442348 A | 5/2009 |

(Continued)

*Primary Examiner* — Lana N Le
(74) *Attorney, Agent, or Firm* — Slater Matsil, LLP

(57) ABSTRACT

A signal clipping processing method and a device, the method including performing peak detection on an input signal, so as to obtain amplitude information, phase information, and location information of a peak signal of the input signal; obtaining, according to amplitude information and phase information of each peak signal, a peak forming factor corresponding to each peak signal, and separately outputting, according to location information of each peak signal, a corresponding cancellation pulse sequence; and calculating a sum of products of peak forming factors corresponding to all peak signals and cancellation pulse sequences corresponding to all the peak signals, so as to obtain a clipping noise, and using a difference between the input signal and the clipping noise as a signal obtained after clipping processing.

20 Claims, 19 Drawing Sheets

(56) References Cited

U.S. PATENT DOCUMENTS

| | | | |
|---|---|---|---|
| 2004/0218689 A1* | 11/2004 | Akhtman | H04L 27/2624 375/296 |
| 2005/0169411 A1 | 8/2005 | Kroeger | |
| 2008/0150625 A1* | 6/2008 | Sundstrom | H04L 27/2624 327/551 |
| 2010/0020895 A1 | 1/2010 | Jiang et al. | |
| 2014/0044215 A1* | 2/2014 | Mundarath | H04L 27/2624 375/297 |
| 2014/0169496 A1* | 6/2014 | Yang | H04B 1/0475 375/296 |

FOREIGN PATENT DOCUMENTS

| | | |
|---|---|---|
| CN | 101969423 A | 2/2011 |
| CN | 103036840 A | 4/2013 |
| EP | 1788768 A2 | 5/2007 |
| EP | 2109227 A1 | 10/2009 |
| RU | 2359409 C2 | 6/2009 |

* cited by examiner

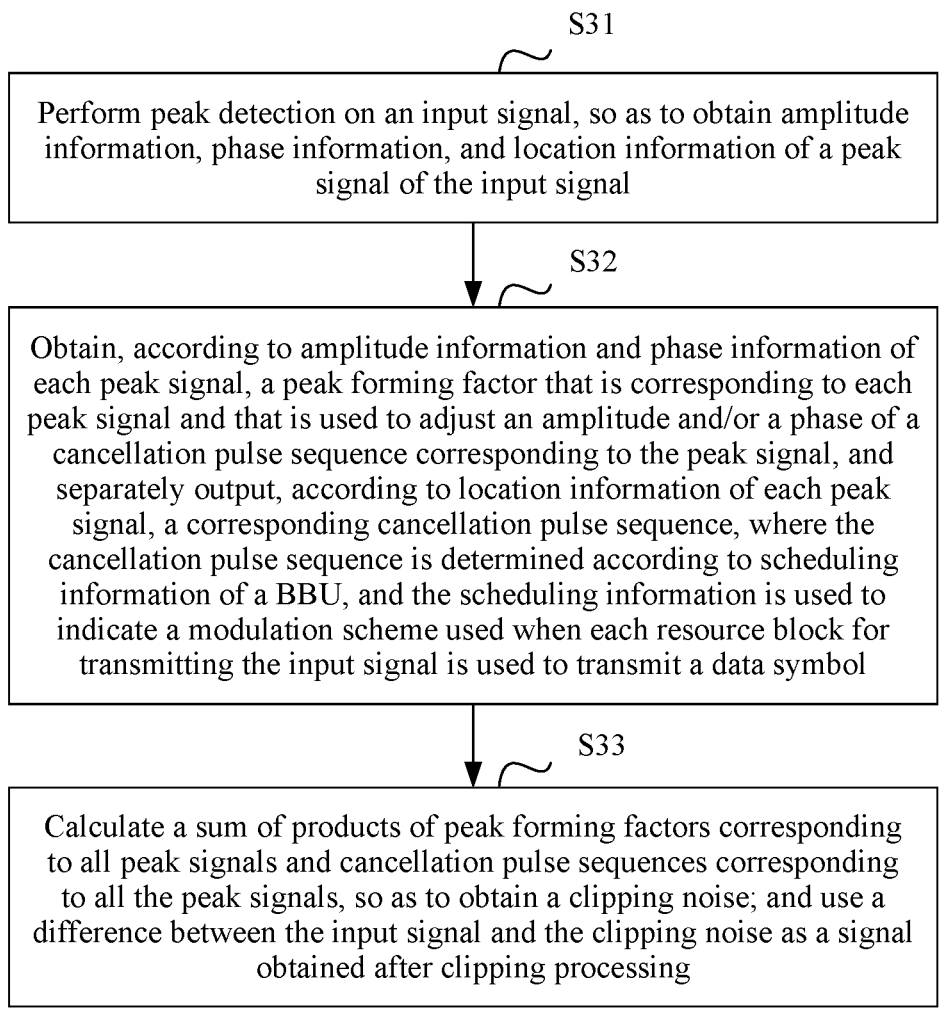

S31
Perform peak detection on an input signal, so as to obtain amplitude information, phase information, and location information of a peak signal of the input signal S32
Obtain, according to amplitude information and phase information of each peak signal, a peak forming factor that is corresponding to each peak signal and that is used to adjust an amplitude and/or a phase of a cancellation pulse sequence corresponding to the peak signal, and separately output, according to location information of each peak signal, a corresponding cancellation pulse sequence, where the cancellation pulse sequence is determined according to scheduling information of a BBU, and the scheduling information is used to indicate a modulation scheme used when each resource block for transmitting the input signal is used to transmit a data symbol S33
Calculate a sum of products of peak forming factors corresponding to all peak signals and cancellation pulse sequences corresponding to all the peak signals, so as to obtain a clipping noise; and use a difference between the input signal and the clipping noise as a signal obtained after clipping processing

FIG. 3

SIGNAL CLIPPING PROCESSING METHOD AND DEVICE

CROSS-REFERENCE TO RELATED APPLICATIONS

This application is a continuation of International Application No. PCT/CN2014/095989, filed on Dec. 31, 2014, the disclosure of which is hereby incorporated by reference in its entirety.

TECHNICAL FIELD

The present invention relates to the field of wireless communications technologies, and in particular, to a signal clipping processing method and a device.

BACKGROUND

In a wireless communications system, a base station system includes a baseband unit (BBU) and a remote radio unit (RRU). A power amplifier (PA) is the most important active device in a remote radio unit of a radio transmitter, and a function of the power amplifier is to amplify an input signal. Efficiency of the PA is an important factor that affects costs of a radio transmitter. However, the PA is not completely ideal. When an amplitude of an input signal exceeds a linear amplification range of the PA, the PA introduces a non-linear distortion, that is, a non-linear amplification relationship between an output signal and the input signal. To ensure linearity of the PA, power back-off needs to be performed on the input signal, and a value of the power back-off depends on a peak-to-average ratio of a signal. A peak-to-average ratio is a ratio of a signal peak power to an average power. For a same PA, because a gain of the PA is constant, a higher output power indicates higher efficiency of the PA. Therefore, to ensure linearity of the PA, for a higher peak-to-average ratio of a signal, a higher level of power back-off needs to be performed, which causes a lower output power. When a peak-to-average ratio of a signal is decreased, efficiency of the PA may be indirectly improved. Therefore, a peak-to-average ratio of a signal is an important parameter for the radio transmitter.

For a communications system that uses a multi-carrier technology (such as orthogonal frequency division multiplex (OFDM)), a peak-to-average ratio of a baseband signal is high. A conventional method for decreasing a peak-to-average ratio of a signal is to use a crest factor reduction (CFR) technology. As shown in FIG. 1, a peak-to-average ratio of an original signal is A (that is, a value obtained by dividing a peak power by a signal average power), some signals whose amplitudes are relatively high are located in a non-linear amplification zone. After a clipping technology is used, a peak-to-average ratio is decreased (as shown in B in FIG. 1). In this case, all signals are located in a linear amplification zone. Further, an average power of an input signal may be increased, so that a sum of the peak power and the gain is still equal to a saturation point, thereby improving efficiency of the PA. However, the CFR technology increases an error vector magnitude (EVM) of a signal, and an increased EVM indicates that a signal cannot be easily demodulated at a receive end. That is, the CFR technology decreases a peak-to-average ratio of a signal at the cost of the EVM. If the EVM is excessively high, it cannot be ensured that data symbols obtained by using various modulation schemes can be properly demodulated at a receive end.

Currently, a widely used PC-CFR (Peak Cancellation CFR) algorithm is an effective algorithm for decreasing a peak-to-average ratio of a signal. A block diagram of the algorithm is shown in FIG. 2. A high peak-to-average ratio signal is input; peak detection is performed on the signal; a peak amplitude and phase information are output to a peak forming module; and a peak location is output to an allocation module. The peak forming module outputs a peak forming factor that may be represented as $\alpha=(|x|-\gamma)\times\exp(j\theta)$. $|x|$ is an amplitude of a peak signal point, $\gamma$ is a clipping threshold, and $\theta$ is a phase of the peak signal point. The allocation module allocates a cancellation pulse generator (CPG) to a detected peak. The CPG generates a cancellation pulse, the cancellation pulse is pre-stored, and design of the cancellation pulse depends on such information as a bandwidth of a signal. A quantity of CPGs may vary. A sum of products obtained by separately multiplying cancellation pulses corresponding to multiple peaks by peak forming factors corresponding to all peaks is referred to as a clipping noise. After the clipping noise is subtracted from the input high peak-to-average ratio signal that is properly delayed, a signal with a decreased peak-to-average ratio is output. Generally, after the foregoing iteration is performed for two or three times, a preset target peak-to-average ratio of an output signal may be obtained.

In an OFDM system, each resource block (that is, a time-frequency resource that includes OFDM symbols and subcarriers) may transmit data obtained by using different modulation schemes. However, the PC-CFR algorithm uses a constant cancellation pulse that has a consistent amplitude-frequency response on a band. Therefore, after clipping processing is performed on data obtained by using various modulation schemes, obtained EVMs are almost the same. For different modulation schemes, a receive end has different EVM requirements while proper demodulation of data is ensured, and a same EVM is unconducive to further improving efficiency of the PA.

SUMMARY

The present invention provides a signal clipping processing method and a device, so as to meet EVM requirements of different modulation schemes, thereby improving efficiency of a power amplifier.

According to a first aspect, a signal clipping processing method is provided, where the method includes performing peak detection on an input signal, so as to obtain amplitude information, phase information, and location information of a peak signal of the input signal, obtaining, according to amplitude information and phase information of each peak signal, a peak forming factor that is corresponding to each peak signal and that is used to adjust an amplitude and/or a phase of a cancellation pulse sequence corresponding to the peak signal, and separately outputting, according to location information of each peak signal, a corresponding cancellation pulse sequence, where the cancellation pulse sequence is determined according to scheduling information of a baseband unit BBU, and the scheduling information is used to indicate a modulation scheme used when each resource block for transmitting the input signal is used to transmit a data symbol, and calculating a sum of products of peak forming factors corresponding to all peak signals and cancellation pulse sequences corresponding to all the peak signals, so as to obtain a clipping noise, and using a difference between the input signal and the clipping noise as a signal obtained after clipping processing.

With reference to the first aspect, in a first possible implementation manner, the method further includes performing delay processing on the input signal, and the using a difference between the input signal and the clipping noise as a signal obtained after clipping processing includes: using a difference between an input signal obtained after the delay processing and the clipping noise as the signal obtained after the clipping processing.

With reference to the first aspect or the first possible implementation manner of the first aspect, in a second possible implementation manner, a peak forming factor corresponding to the peak signal is obtained by using the following formula according to the amplitude information and the phase information of the peak signal, as below.

$$\alpha=(|x|-\gamma)\times\exp(j\theta)$$

Where $\alpha$ is the peak forming factor, $|x|$ is the amplitude information of the peak signal, $\gamma$ is a set clipping threshold, and $\theta$ is the phase information of the peak signal.

With reference to the first aspect, the first possible implementation manner of the first aspect, or the second possible implementation manner of the first aspect, in a third possible implementation manner, determining the cancellation pulse sequence according to the scheduling information includes determining, according to the scheduling information, a modulation scheme used when each resource block is used to transmit a data symbol, determining, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block, and adding up all determined cancellation pulse sub-sequences corresponding to all resource blocks, so as to obtain the cancellation pulse sequence.

With reference to the third possible implementation manner of the first aspect, in a fourth possible implementation manner, determining the cancellation pulse sequence according to the scheduling information includes, when the scheduling information changes, redetermining the cancellation pulse sequence according to updated scheduling information.

With reference to any one of the first aspect, or the first to the fourth possible implementation manners of the first aspect, in a fifth possible implementation manner, the input signal is a baseband signal from the baseband unit BBU, or a signal obtained after previous clipping processing.

With reference to any one of the first aspect, or the first to the fifth possible implementation manners of the first aspect, in a sixth possible implementation manner, before the performing peak detection on an input signal, the method further includes performing upsampling processing on a received input signal, and using a signal obtained after the upsampling processing as the input signal for performing the peak detection.

According to a second aspect, a communications device is provided, where the communications device includes a cancellation pulse determining module, configured to: determine, according to scheduling information of a BBU, a cancellation pulse sequence, and send the cancellation pulse sequence to each cancellation pulse generation module for storing, where the scheduling information is used to indicate a modulation scheme used when each resource block for transmitting an input signal is used to transmit a data symbol, a peak detection module, configured to perform peak detection on the input signal, so as to obtain amplitude information, phase information, and location information of a peak signal of the input signal, a peak forming module, configured to obtain, according to amplitude information and phase information of each peak signal, a peak forming factor that is corresponding to each peak signal and that is used to adjust an amplitude and/or a phase of a cancellation pulse sequence corresponding to the peak signal, an allocation module, configured to separately send location information of each peak signal to a corresponding cancellation pulse generation module, a cancellation pulse generation module, configured to separately output, according to the location information of each peak signal, a corresponding cancellation pulse sequence, and a processing module, configured to: calculate a sum of products of peak forming factors corresponding to all peak signals and cancellation pulse sequences corresponding to all the peak signals, so as to obtain a clipping noise; and use a difference between the input signal and the clipping noise as a signal obtained after clipping processing.

With reference to the second aspect, in a first possible implementation manner, the communications device further includes: a delay module, configured to perform delay processing on the input signal, and the processing module is specifically configured to use a difference between an input signal obtained after the delay processing and the clipping noise as the signal obtained after the clipping processing.

With reference to the second aspect or the first possible implementation manner of the second aspect, in a second possible implementation manner, the peak forming module obtains, by using the following formula, a peak forming factor corresponding to the peak signal below.

$$\alpha=(|x|-\gamma)\times\exp(j\theta)$$

Where $\alpha$ is the peak forming factor, $|x|$ is the amplitude information of the peak signal, $\gamma$ is a set clipping threshold, and $\theta$ is the phase information of the peak signal.

With reference to the second aspect, or the first possible implementation manner of the second aspect or the second possible implementation manner of the second aspect, in a third possible implementation manner, the cancellation pulse determining module is specifically configured to determine, according to the scheduling information, a modulation scheme used when each resource block is used to transmit a data symbol; determine, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block, and add up all determined cancellation pulse sub-sequences corresponding to all resource blocks, so as to obtain the cancellation pulse sequence.

With reference to the third possible implementation manner of the second aspect, in a fourth possible implementation manner, the cancellation pulse determining module is further configured to when the scheduling information changes, redetermine the cancellation pulse sequence according to updated scheduling information, and send the redetermined cancellation pulse sequence to each cancellation pulse generation module for updating.

With reference to any one of the second aspect, or the first to the fourth possible implementation manners of the second aspect, in a fifth possible implementation manner, the input signal is a baseband signal from the baseband unit BBU, or a signal obtained after previous clipping processing.

With reference to any one of the second aspect, or the first to the fifth possible implementation manners of the second aspect, in a sixth possible implementation manner, if the communications device is an RRU, the communications device further includes an upsampling module that is separately connected to the peak detection module and the delay module, configured to perform upsampling processing on a received input signal, and input a signal obtained after the upsampling processing to the peak detection module as an input signal of the peak detection module.

With reference to any one of the second aspect, or the first to the sixth possible implementation manners of the second aspect, in a seventh possible implementation manner, if the communications device is the BBU, the processing module is further configured to send the signal obtained after the clipping processing to an RRU for performing upsampling processing and intermediate frequency clipping processing.

According to a third aspect, a communications device is provided, where the communications device includes a transceiver, configured to receive an input signal, and a processor, configured to: determine a cancellation pulse sequence according to scheduling information of a BBU, where the scheduling information is used to indicate a modulation scheme used when each resource block for transmitting an input signal is used to transmit a data symbol; perform peak detection on the input signal, so as to obtain amplitude information, phase information, and location information of a peak signal of the input signal, obtain, according to amplitude information and phase information of each peak signal, a peak forming factor that is corresponding to each peak signal and that is used to adjust an amplitude and/or a phase of a cancellation pulse sequence corresponding to the peak signal, separately send location information of each peak signal to a corresponding cancellation pulse generator, separately output, according to the location information of each peak signal, a corresponding cancellation pulse sequence, and calculate a sum of products of peak forming factors corresponding to all peak signals and cancellation pulse sequences corresponding to all the peak signals, so as to obtain a clipping noise, use a difference between the input signal and the clipping noise as a signal obtained after clipping processing, and output, by using the transceiver, the signal obtained after the clipping processing.

With reference to the third aspect, in a first possible implementation manner, the processor is further configured to perform delay processing on the input signal, and the processor is specifically configured to use a difference between an input signal obtained after the delay processing and the clipping noise as the signal obtained after the clipping processing.

With reference to the third aspect or the first possible implementation manner of the third aspect, in a second possible implementation manner, the processor obtains, by using the following formula, a peak forming factor corresponding to the peak signal below.

$$\alpha = (|x| - \gamma) \times \exp(j\theta)$$

Where $\alpha$ is the peak forming factor, $|x|$ is the amplitude information of the peak signal, $\gamma$ is a set clipping threshold, and $\theta$ is the phase information of the peak signal.

With reference to the third aspect, the first possible implementation manner of the third aspect, or the second possible implementation manner of the third aspect, in a third possible implementation manner, the processor is specifically configured to determine, according to the scheduling information, a modulation scheme used when each resource block is used to transmit a data symbol; determine, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block; and add up determined cancellation pulse sub-sequences corresponding to all resource blocks, so as to obtain the cancellation pulse sequence.

With reference to the third possible implementation manner of the third aspect, in a fourth possible implementation manner, the processor is further configured to, when the scheduling information changes, redetermine the cancellation pulse sequence according to updated scheduling information, and send the redetermined cancellation pulse sequence to each cancellation pulse generation module for updating.

With reference to any one of the third aspect, or the first to the fourth possible implementation manners of the third aspect, in a fifth possible implementation manner, the input signal is a baseband signal from the BBU, or a signal obtained after previous clipping processing.

With reference to any one of the third aspect, or the first to the fifth possible implementation manners of the third aspect, in a sixth possible implementation manner, if the communications device is an RRU, the processor is further configured to perform upsampling processing on a received input signal, and use a signal obtained after the upsampling processing as the input signal for performing the peak detection.

With reference to any one of the third aspect, or the first to the sixth possible implementation manners of the third aspect, in a seventh possible implementation manner, if the communications device is the BBU, the transceiver is further configured to send the signal obtained after the clipping processing to an RRU for performing upsampling processing and intermediate frequency clipping processing.

In the present invention, a cancellation pulse sequence is determined according to scheduling information of a BBU, and the scheduling information is used to indicate a modulation scheme used when each resource block for transmitting an input signal is used to transmit a data symbol, that is, the cancellation pulse sequence is determined according to the modulation scheme used when each resource block for transmitting the input signal is used to transmit a data symbol. In this way, after clipping processing is performed by using the cancellation pulse sequence, EVM losses of data obtained by using different modulation schemes are different, so as to meet EVM requirements of different modulation schemes while proper demodulation of data is ensured. Therefore, a peak-to-average ratio of a signal obtained after the clipping processing is lower, thereby further improving efficiency of a power amplifier.

BRIEF DESCRIPTION OF THE DRAWINGS

FIG. 3 is a schematic diagram of a signal clipping processing method according to an embodiment of the present invention;

DETAILED DESCRIPTION OF ILLUSTRATIVE EMBODIMENTS

Figure 1:
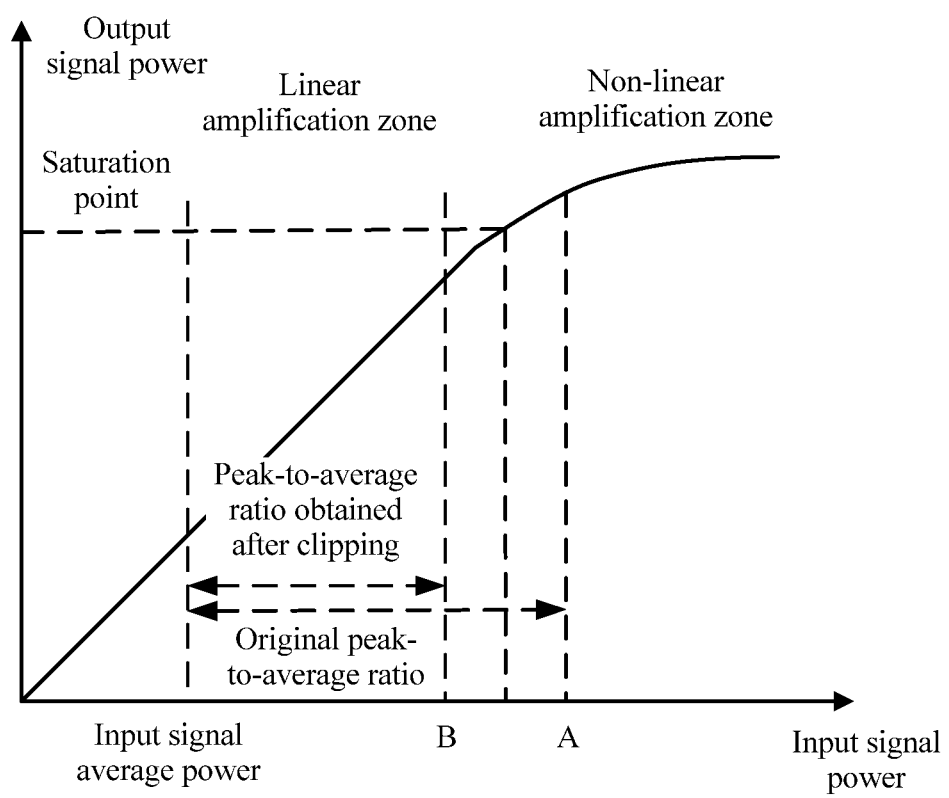
FIG. 1 is a schematic diagram of an input signal power and an output signal power in a CFR technology.
Figure 2:
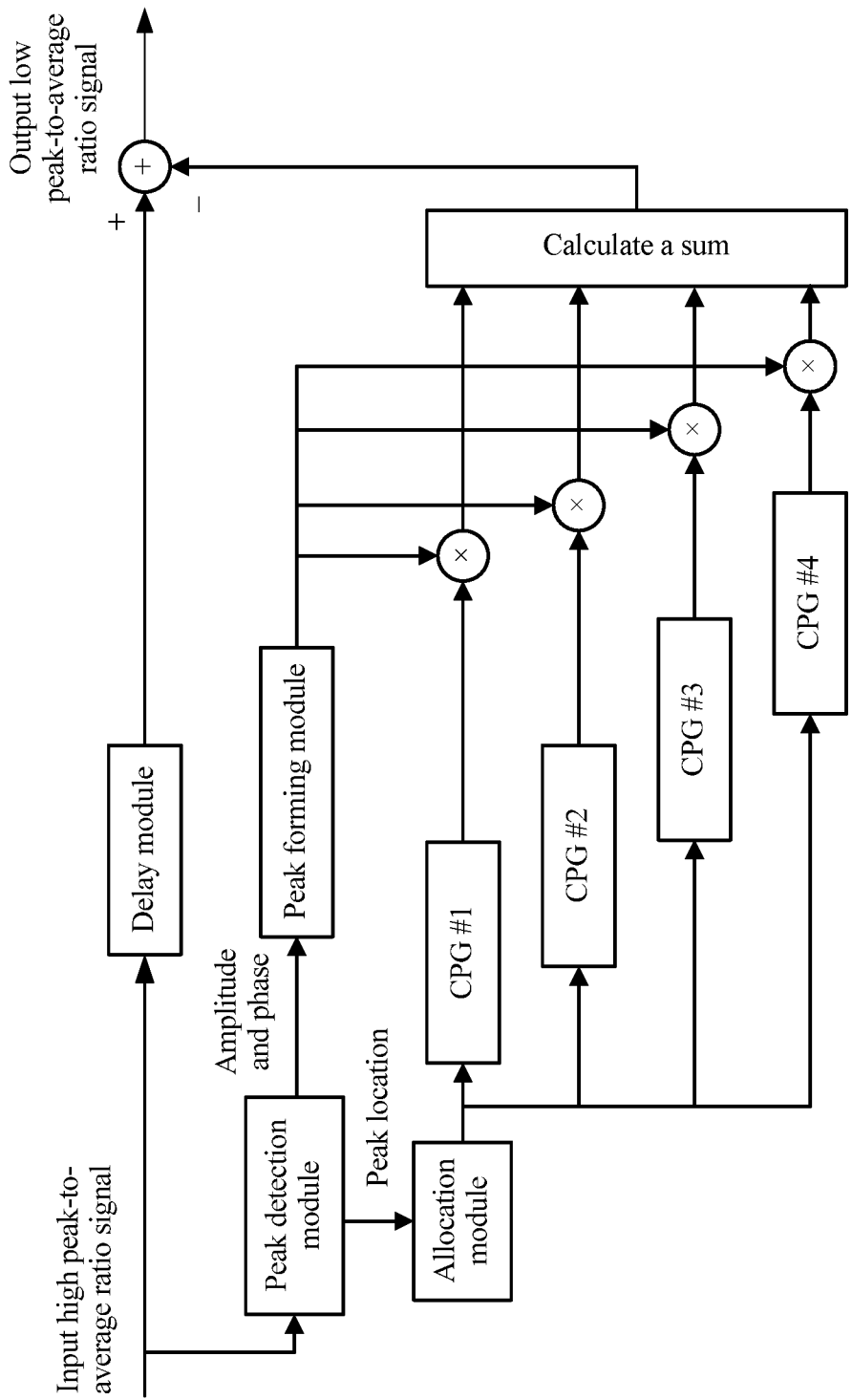
FIG. 2 is a schematic diagram of a PC-CFR algorithm.

In the embodiments of the present invention, clipping processing is performed according to scheduling information that is of a baseband unit and that is used to indicate a modulation scheme used when each resource block for transmitting an input signal is used to transmit a data symbol. Therefore, a peak-to-average ratio of a signal obtained after the clipping processing is lower while proper demodulation of data is ensured, thereby improving efficiency of a power amplifier.

The following further describes the embodiments of the present invention in detail with reference to this specification. It should be understood that the embodiments described herein are merely used to explain the present invention but are not intended to limit the present invention.

As shown in FIG. 3, a clipping processing method provided in an embodiment of the present invention includes:

S31. Perform peak detection on an input signal, so as to obtain amplitude information, phase information, and location information of a peak signal of the input signal.

S32. Obtain, according to amplitude information and phase information of each peak signal, a peak forming factor that is corresponding to each peak signal and that is used to adjust an amplitude and/or a phase of a cancellation pulse sequence corresponding to the peak signal, and separately output, according to location information of each peak signal, a corresponding cancellation pulse sequence, where the cancellation pulse sequence is determined according to scheduling information of a BBU, and the scheduling information is used to indicate a modulation scheme used when each resource block for transmitting the input signal is used to transmit a data symbol.

S33. Calculate a sum of products of peak forming factors corresponding to all peak signals and cancellation pulse sequences corresponding to all the peak signals, so as to obtain a clipping noise; and use a difference between the input signal and the clipping noise as a signal obtained after clipping processing.

In the method provided in this embodiment of the present invention, a cancellation pulse sequence is determined according to scheduling information of a BBU, and the scheduling information is used to indicate a modulation scheme used when each resource block for transmitting an input signal is used to transmit a data symbol, that is, the cancellation pulse sequence is determined according to the modulation scheme used when each resource block for transmitting the input signal is used to transmit a data symbol. In this way, after clipping processing is performed by using the cancellation pulse sequence, EVM losses of data obtained by using different modulation schemes are different, so as to meet EVM requirements of different modulation schemes while proper demodulation of data is ensured. Therefore, a peak-to-average ratio of a signal obtained after the clipping processing is lower, thereby further improving efficiency of a power amplifier.

In this embodiment, the foregoing step S31 to step S33 are an iteration process. Generally, after the iteration process is performed for two or three times, a preset target peak-to-average ratio of an output signal may be obtained. If clipping processing is performed for the first time, the input signal of the foregoing step S31 to step S33 is a baseband signal from the BBU; or if clipping processing is performed for the second time or a subsequent time, the input signal of the foregoing step S31 to step S33 is a signal obtained after previous clipping processing.

In this embodiment, the foregoing step S31 to step S33 may be implemented in a remote radio unit or may be implemented in a baseband unit.

Scheduling information involved in this embodiment of the present invention includes a modulation scheme used when each resource block for transmitting the input signal is used to transmit a data symbol. As an implementation manner, the scheduling information may be represented by using bit information. For example, every two bits represent a modulation scheme used when a resource block is used to transmit a data symbol: "01" represents reservation, "01" represents that a modulation scheme used when the resource block is used to transmit a data symbol is quadrature phase shift keying (QPSK), "10" represents that a modulation scheme used when the resource block is used to transmit a data symbol is 16 quadrature amplitude modulation (16QAM), and "11" represents that a modulation scheme used when the resource block is used to transmit a data symbol is 64QAM. It is assumed that a modulation scheme used when resource blocks 1 to 7 are used to transmit a data symbol is a QPSK modulation scheme, a modulation scheme used when resource blocks 8 to 13 are used to transmit a data symbol is a 16QAM modulation scheme, and a modulation scheme used when resource blocks 14 to 20 are used to transmit a data symbol is a 64QAM modulation scheme, 40-bit signaling may be used to represent scheduling information, and is specifically: 0101010101010110101010101011111111111111.

In this embodiment, if the foregoing step S31 to step S33 are implemented in the remote radio unit, the scheduling information needs to be obtained from the baseband unit by interacting with the baseband unit; or if the foregoing step S31 to step S33 are implemented in the baseband unit, the scheduling information may be directly obtained.

Based on any one of the foregoing embodiments, in step S31, by means of the peak detection performed on the input signal, one peak signal may be detected, or two or more peak signals may be detected.

Correspondingly, if, in step S31, multiple peak signals are detected, and amplitude information, phase information, and location information of multiple peak signals are obtained, in step S32, for all peak signals detected in step S31, corresponding peak forming factors may be obtained, and cancellation pulse sequences corresponding to all peak signals are separately output. Alternatively, for some peak signals detected in step S31, corresponding peak forming factors may be obtained, and cancellation pulse sequences corresponding to all of the some peak signals are separately output.

In this embodiment, in step S32, the peak forming factor that is corresponding to each peak signal and that is used to adjust an amplitude and/or a phase of a cancellation pulse sequence corresponding to the peak signal is obtained by using the following formula according to the amplitude information and the phase information of the peak signal:

$$\alpha = (|x| - \gamma) \times \exp(j\theta)$$

where $\alpha$ is the peak forming factor, $|x|$ is the amplitude information of the peak signal, $\gamma$ is a set clipping threshold, and $\theta$ is the phase information of the peak signal.

Specifically, the peak forming factor that is corresponding to the peak signal obtained in step S32 is a complex number. The amplitude and/or the phase of a maximum sampling point of the cancellation pulse sequence corresponding to the peak signal may be adjusted according to the peak forming factor, for example, to perform amplitude scaling, so that an amplitude and a phase of a maximum sampling point of the cancellation pulse sequence are the same as an amplitude and a phase of a peak signal corresponding to the cancellation pulse sequence.

In this embodiment, determining the cancellation pulse sequence according to the scheduling information includes determining, according to the scheduling information, a modulation scheme used when each resource block is used to transmit a data symbol, determining, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block, and adding up determined cancellation pulse sub-sequences corresponding to all resource blocks, so as to obtain the cancellation pulse sequence.

Specifically, when a cancellation pulse sequence is designed, for a resource block that carries a data symbol obtained by using a high-order modulation scheme (for example, 64QAM), an amplitude-frequency response that is of a cancellation pulse sub-sequence corresponding to the resource block and that is on a frequency band occupied by the resource block is relatively small. On the contrary, for a resource block that carries a data symbol obtained by using a low-order modulation scheme (for example, QPSK), an amplitude-frequency response that is of a cancellation pulse sub-sequence corresponding to the resource block and that is on a frequency band occupied by the resource block is relatively large. In this embodiment of the present invention, a method for determining cancellation pulse sequence has relatively low impact on data obtained by using the high-order modulation scheme and has relatively high impact on data obtained by using the low-order modulation scheme. Therefore, not only data obtained by using different modulation schemes can be properly demodulated at a receive end, but a peak-to-average ratio of an output signal is lower.

Figure 4A:
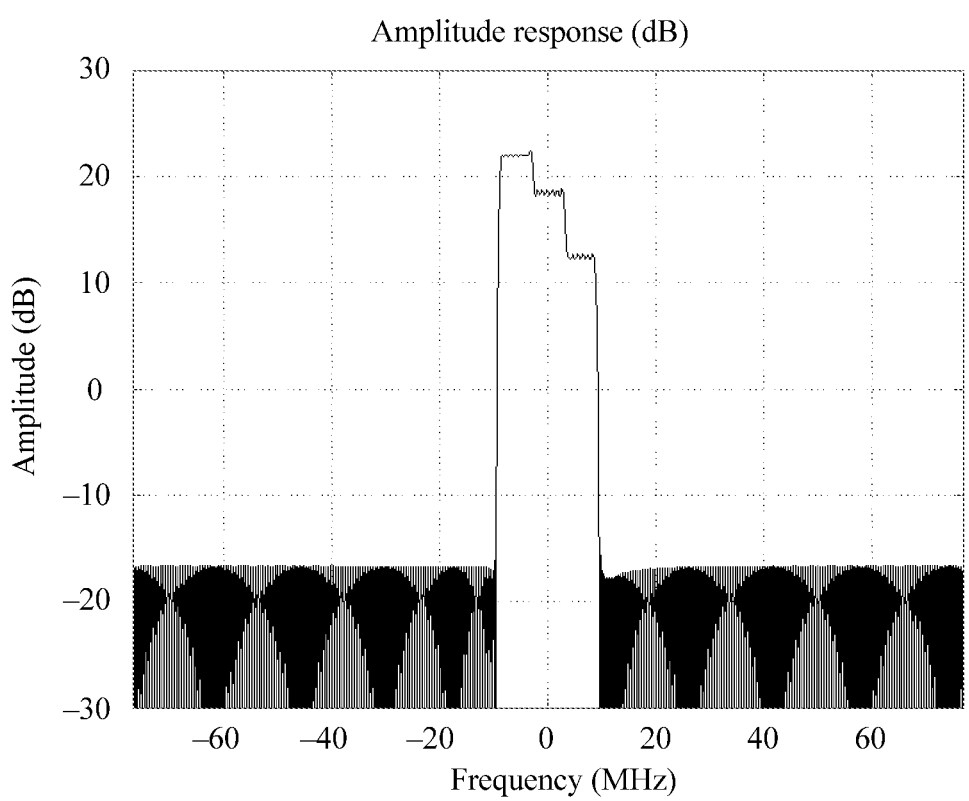
FIG. 4A is a schematic diagram of a frequency-domain form of a cancellation pulse sequence used in an embodiment of the present invention.
Figure 4B:
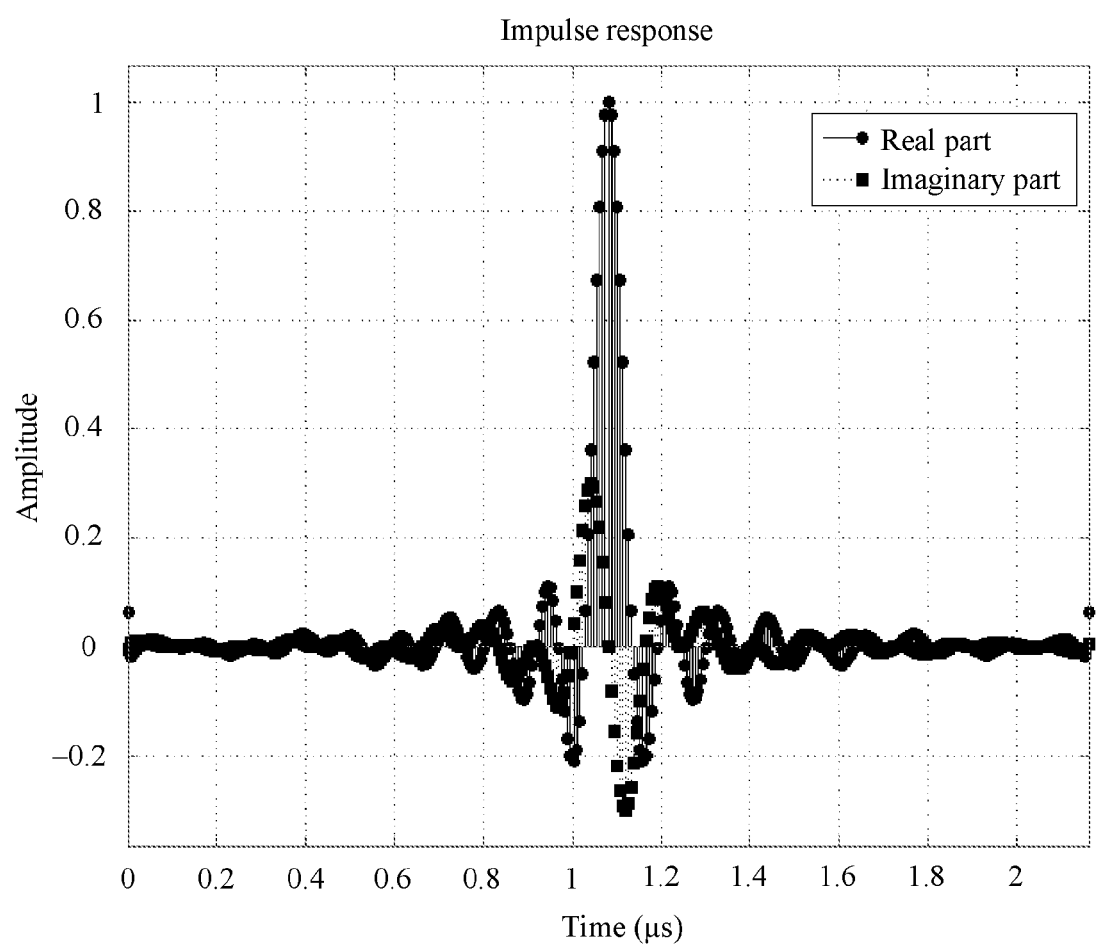
FIG. 4B is a schematic diagram of a time-domain form of a cancellation pulse sequence used in an embodiment of the present invention.
Figure 5A:
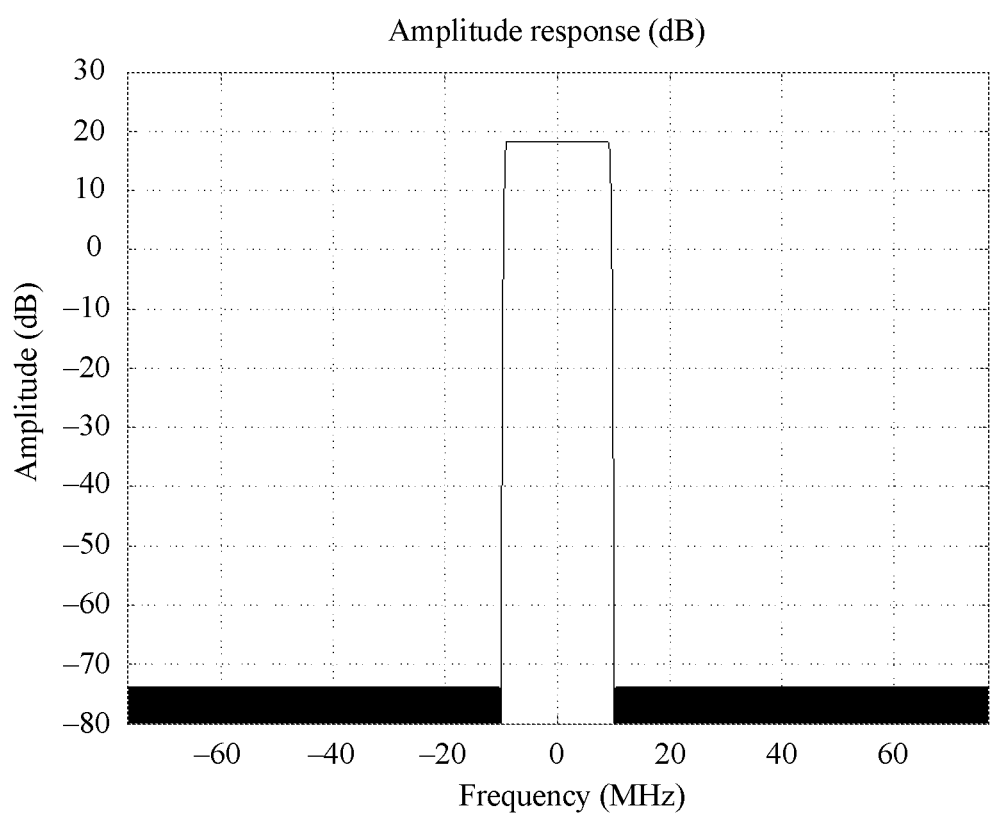
FIG. 5A is a schematic diagram of a frequency-domain form of a cancellation pulse sequence used in a PC-CFR algorithm.
Figure 5B:
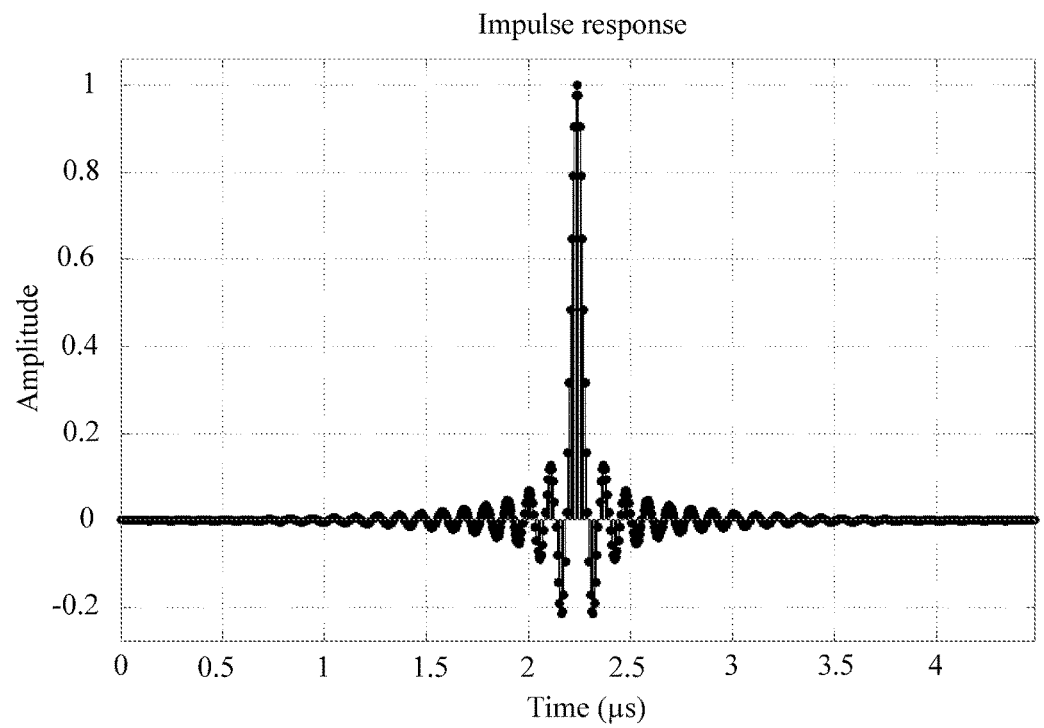
FIG. 5B is a schematic diagram of a time-domain form of a cancellation pulse sequence used in a PC-CFR algorithm.

For example, it is assumed that data carried by a signal bandwidth of 18 MHz is separately modulated by using QPSK, 16QAM, and 64QAM. When a cancellation pulse sequence is designed, an amplitude-frequency response that is of a cancellation pulse sub-sequence corresponding to data obtained by using the QPSK and that is on a frequency band occupied by a resource block that carries the data is the largest; an amplitude-frequency response that is of a cancellation pulse sub-sequence corresponding to data obtained by using the 16QAM and that is on a frequency band occupied by a resource block that carries the data is the second largest; and an amplitude-frequency response that is of a cancellation pulse sub-sequence corresponding to data obtained by using the 64QAM and that is on a frequency band occupied by a resource block that carries the data is the smallest. A frequency-domain form of the designed cancellation pulse sequence is shown in FIG. 4A, and a time-domain form of the designed cancellation pulse sequence is shown in FIG. 4B. Compared with a frequency-domain form (as shown in FIG. 5A) and a time-domain form (as shown in FIG. 5B) of an existing PC-CFR cancellation pulse sequence, in a frequency domain, amplitude-frequency responses of cancellation pulse sequences in a signal bandwidth are different, and in a time domain, a cancellation pulse sequence is a series of complex values.

Preferably, a specific value of a cancellation pulse sequence may be configured in proportion according to target EVM values of different modulation schemes. For example, it is assumed that data carried by a signal bandwidth of 18 MHz is separately modulated by using QPSK, 16QAM, and 64QAM. When proportional configuration is performed, an amplitude-frequency response that is of a cancellation pulse sub-sequence corresponding to data obtained by using QPSK and that is on a frequency band occupied by a resource block that carries the data is the largest; an amplitude-frequency response that is of a cancellation pulse sub-sequence corresponding to data obtained by using 16QAM and that is on a frequency band occupied by a resource block that carries the data is the second largest; and an amplitude-frequency response that is of a cancellation pulse sub-sequence corresponding to data obtained by using 64QAM and that is on a frequency band occupied by a resource block that carries the data is the smallest. Therefore, amplitude-frequency responses of all cancellation pulse sub-sequences of cancellation pulse sequences may be configured to 1.5:1:0.5.

Based on any one of the foregoing embodiments, in this embodiment, because a modulation scheme used when each resource block is used to transmit a data symbol changes, scheduling information that is used to indicate a modulation scheme used when each resource block for transmitting the input signal is used to transmit a data symbol changes accordingly; and determining the cancellation pulse sequence according to the scheduling information includes, when the scheduling information changes, redetermining the cancellation pulse sequence according to updated scheduling information.

Based on any one of the foregoing embodiments, in this embodiment, if the foregoing step S31 to step S33 are implemented in the remote radio unit, before S31, the method further includes performing upsampling processing on a received input signal, and using a signal obtained after the upsampling processing as the input signal for performing the peak detection.

Specifically, if upsampling is performed on an input signal by using an upsampling multiple of 5, a digital intermediate frequency signal is output. That is, four 0s are inserted between two sampling points, and a result obtained thereof is sent to a low-pass finite impulse response (FIR) filter. A passband of the filter is 10 MHz, a stopband of the filter is 20.72 MHz, and a sampling rate of the filter is 153.6 MHz. Certainly, this embodiment of the present invention is not limited to using an upsampling multiple of 5, and another upsampling multiple may also be used. However, if the upsampling multiple is excessively small, for a radio frequency signal obtained after clipping, peak regrowth occurs. If the upsampling multiple is excessively large, complexity of clipping processing is improved. In this embodiment of the present invention, before clipping processing is performed, upsampling processing is first performed on an input signal, so as to avoid peak regrowth of a radio frequency signal obtained after clipping.

In the following, a result obtained after clipping processing is performed by using the method provided in this embodiment of the present invention is compared with a result obtained after clipping processing is performed by using the existing PC-CFR algorithm. Details are as follows.

It is assumed that a baseband signal from the baseband unit is a Long Term Evolution (LTE) signal of 20 MHz. A baseband signal of an $l^{th}$ OFDM symbol is represented as:

$$s_l(t) = \sum_{k=-600}^{-1} a_{k(-),l} \cdot e^{j2\pi k \Delta f(t-N_{CP,l}T_s)} + \sum_{k=1}^{600} a_{k(+),l} \cdot e^{j2\pi k \Delta f(t-N_{CP,l}T_s)}$$

where $\alpha_{k,l}$ represents a to-be-transmitted data symbol carried on a subcarrier, where each subcarrier carries a data symbol, and there are a total of 1200 subcarriers; $\lvert f$ represents a subcarrier interval (which is 15 KHz in this embodiment); $N_{cp,l}$ represents a quantity of cyclic prefix sampling points; $T_s=1/f_s$ represents sampling time ($f_s=30.72$ MHz in this embodiment); and k represents a subcarrier number whose value range is [−600 600].

Figure 6:
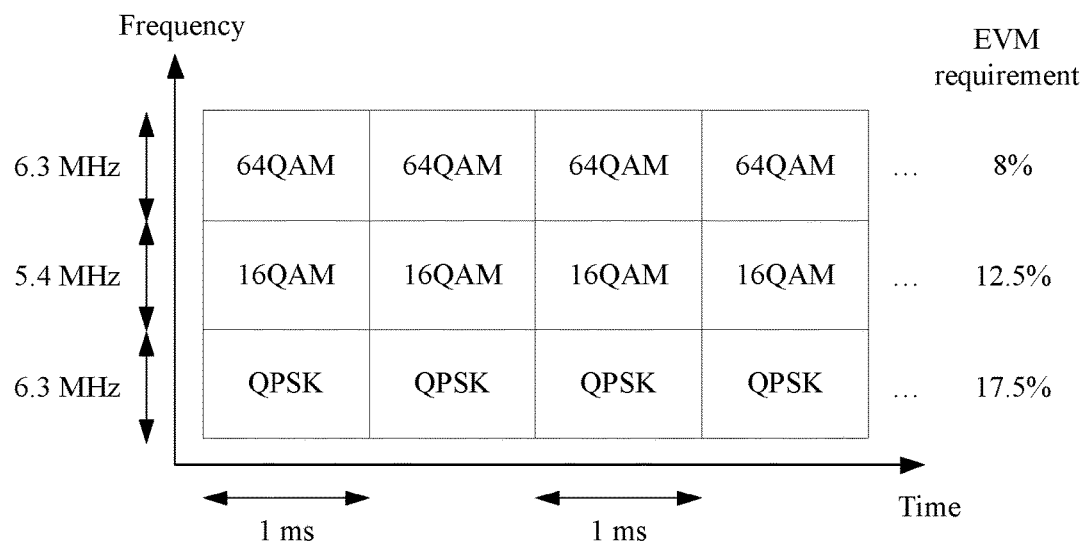
FIG. 6 is a schematic diagram of resource block allocation according to an embodiment of the present invention.

An actual signal bandwidth is 18 MHz. It is assumed that a bandwidth of a resource block that can be scheduled is 900 KHz, to-be-transmitted data symbols in a same resource block use a same modulation scheme, and a scheduling period is 1 ms. In each scheduling period, a quantity of resource blocks is 20. As shown in FIG. 6, a bandwidth is divided into three consecutive parts. Bandwidths of all the parts are respectively 6.3 MHz, 5.4 MHz, and 6.3 MHz, and respectively include 7, 6, and 7 resource blocks. The three parts are respectively used to transmit data symbols obtained by using QPSK, 16QAM, and 64QAM.

Figure 7:
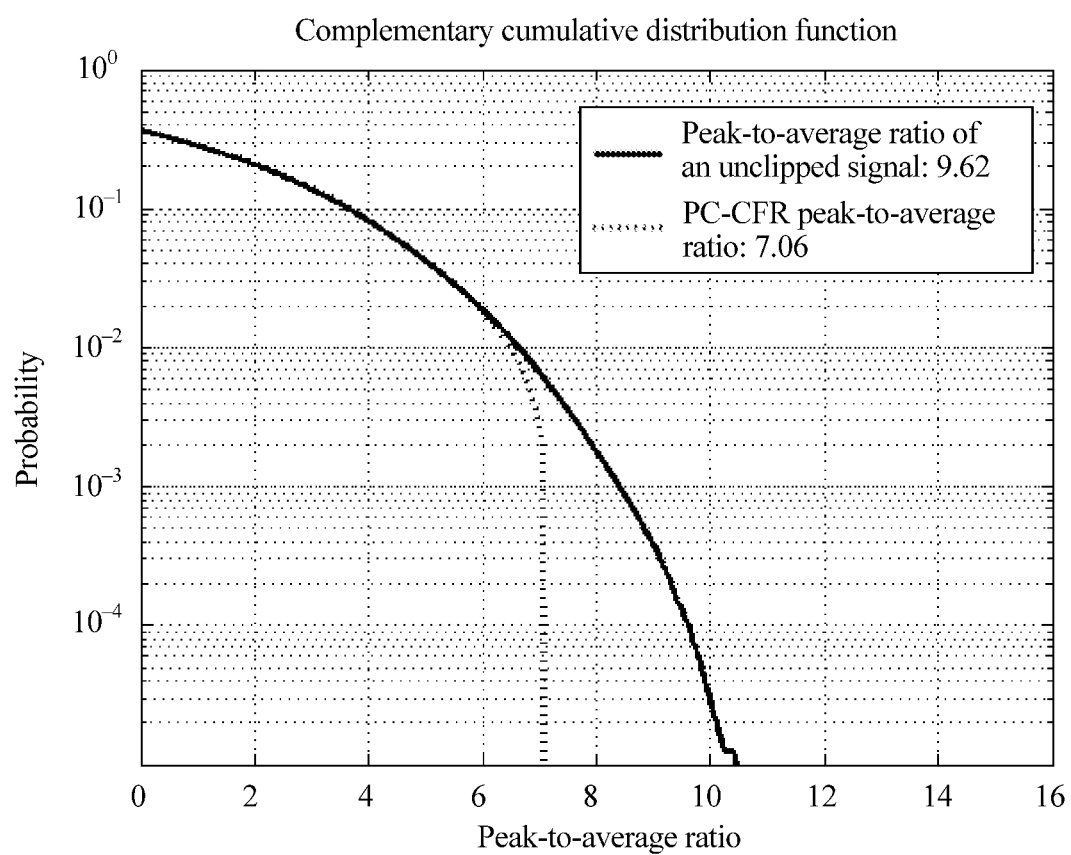
FIG. 7 is a schematic diagram of a signal peak-to-average ratio obtained by using a PC-CFR algorithm.
Figure 8A:
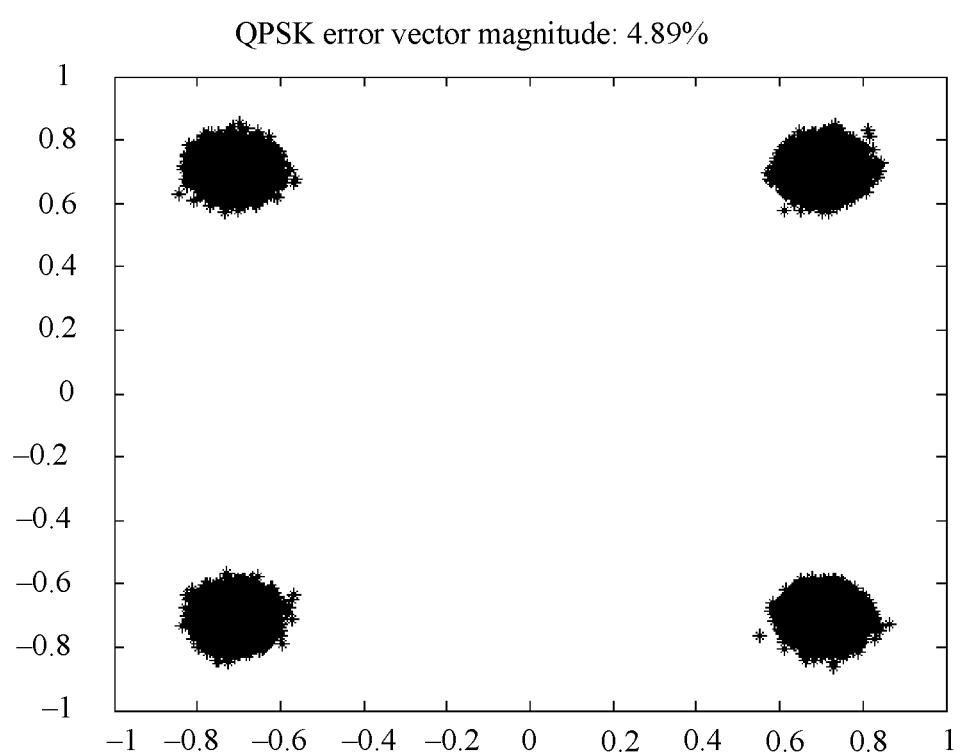
FIG. 8A is a constellation diagram obtained by using a QPSK modulation scheme in a PC-CFR algorithm.
Figure 8B:
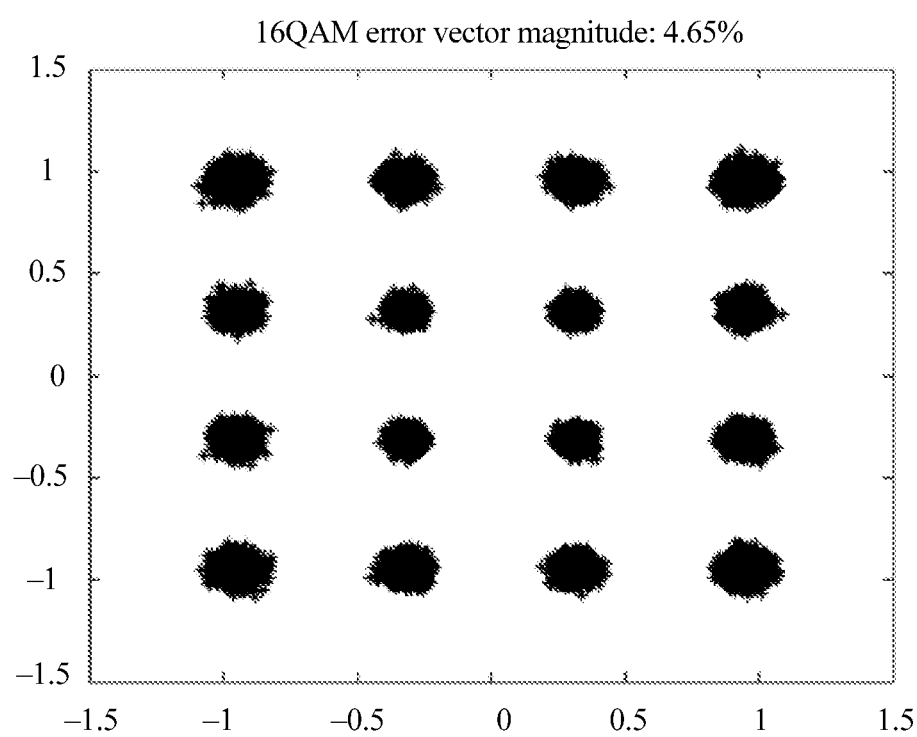
FIG. 8B is a constellation diagram obtained by using a 16QAM modulation scheme in a PC-CFR algorithm.
Figure 8C:
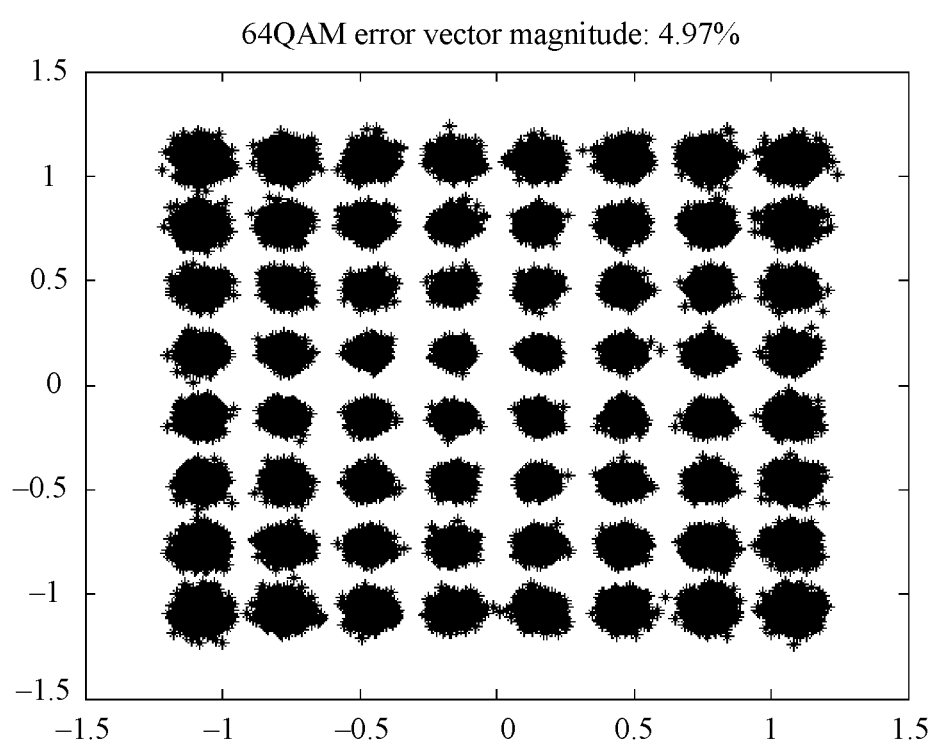
FIG. 8C is a constellation diagram obtained by using a 64QAM modulation scheme in a PC-CFR algorithm.

It is assumed that a target peak-to-average ratio is set to 7 dB. After iteration based on a PC-CFR algorithm is performed three times, a peak-to-average ratio of a signal is decreased from 9.62 dB to 7.06 dB, as shown in FIG. 7, and a preset target is met. From a perspective of EVM, for a symbol modulated by using QPSK, it can be learned from a constellation diagram shown in FIG. 8A that an obtained EVM is 4.89%; for a symbol modulated by using 16QAM, it can be learned from a constellation diagram shown in FIG. 8B that an obtained EVM is 4.65%; and for a symbol modulated by using 64QAM, it can be learned from a constellation diagram shown in FIG. 8C that an obtained EVM is 4.97%. In this case, it can be learned from the constellation diagrams that data symbols modulated by using the QPSK and the 16QAM can be easily demodulated. EVMs required by the QPSK and the 16QAM are respectively less than 12.5% and less than 17.5%. This indicates that a peak-to-average ratio of a signal can be further decreased.

Figure 9:
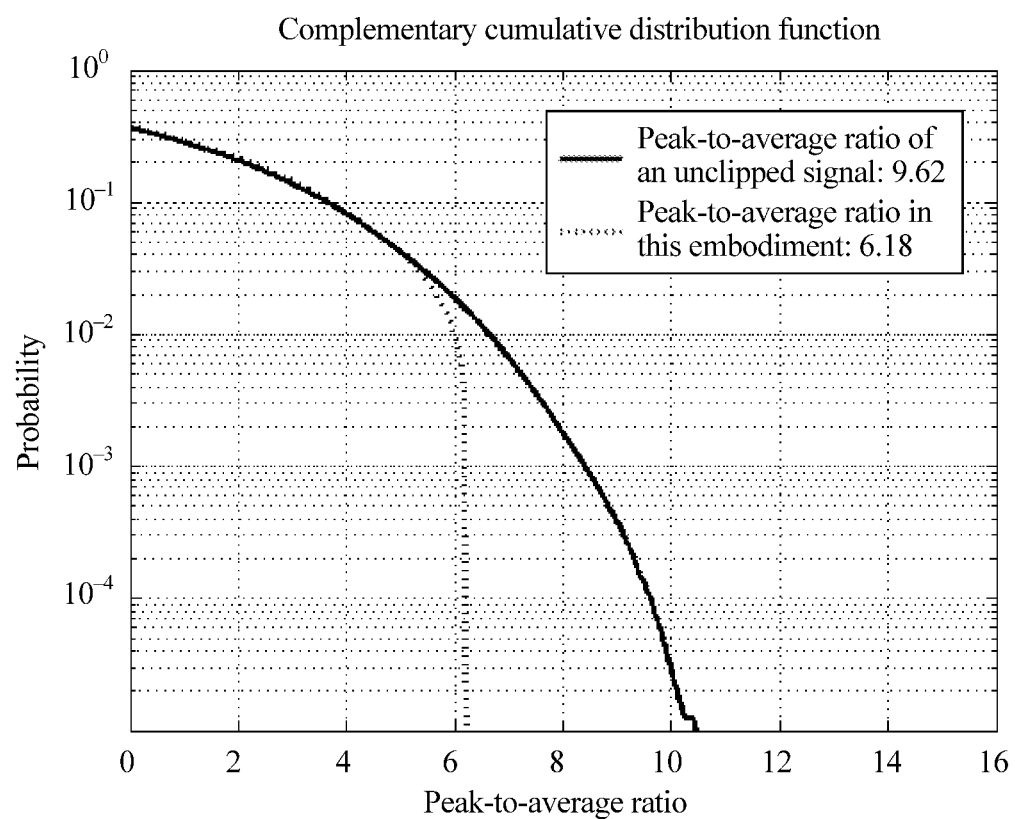
FIG. 9 is a schematic diagram of a signal peak-to-average ratio obtained by using a method according to an embodiment of the present invention.
Figure 10A:
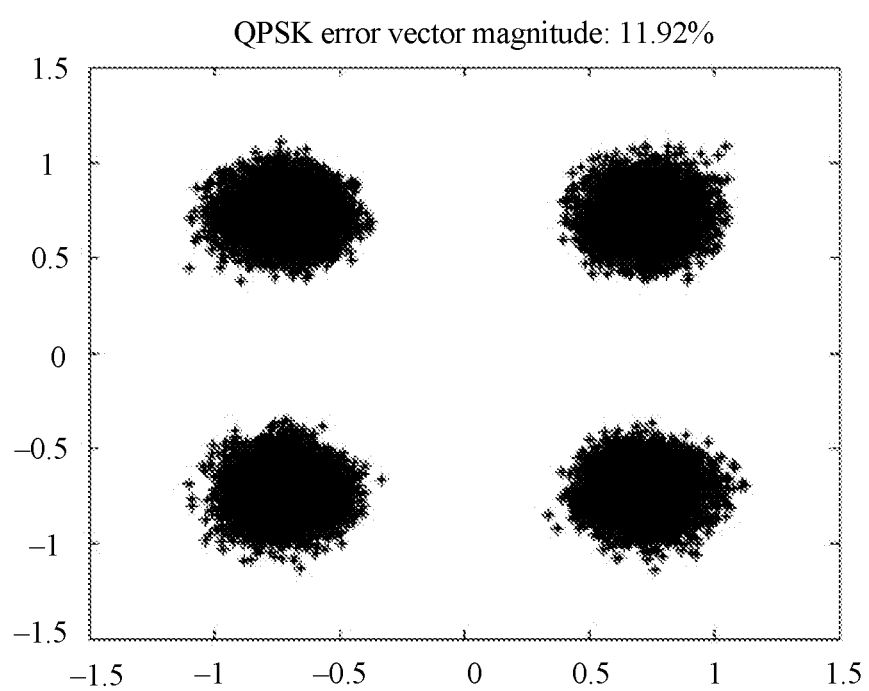
FIG. 10A is a constellation diagram obtained by using a QPSK modulation scheme in a method according to an embodiment of the present invention.
Figure 10B:
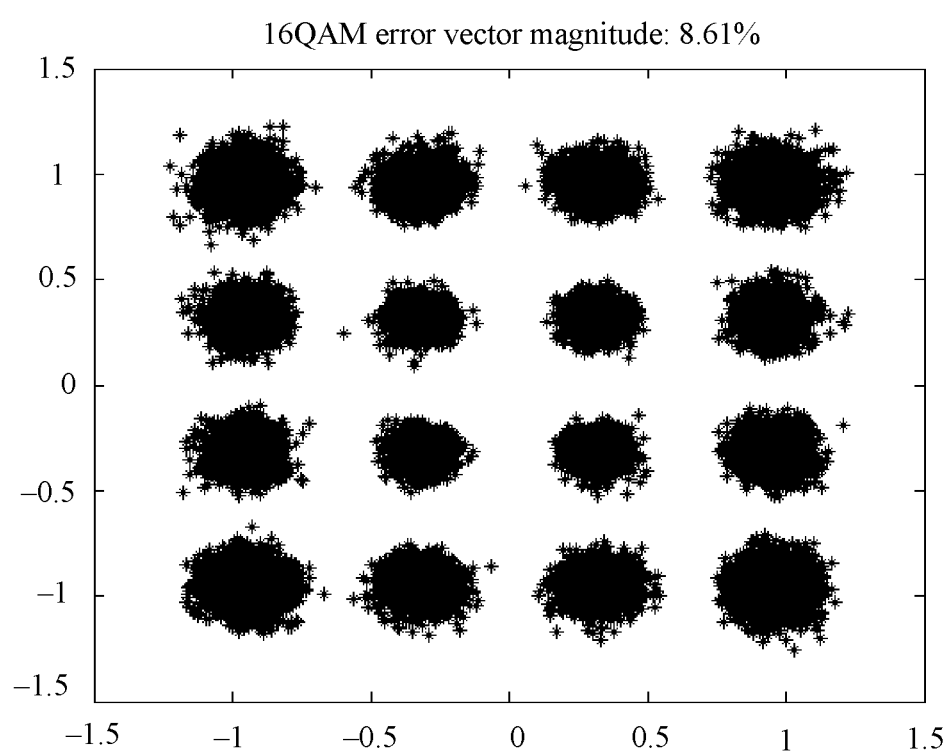
FIG. 10B is a constellation diagram obtained by using a 16QAM modulation scheme in a method according to an embodiment of the present invention.
Figure 10C:
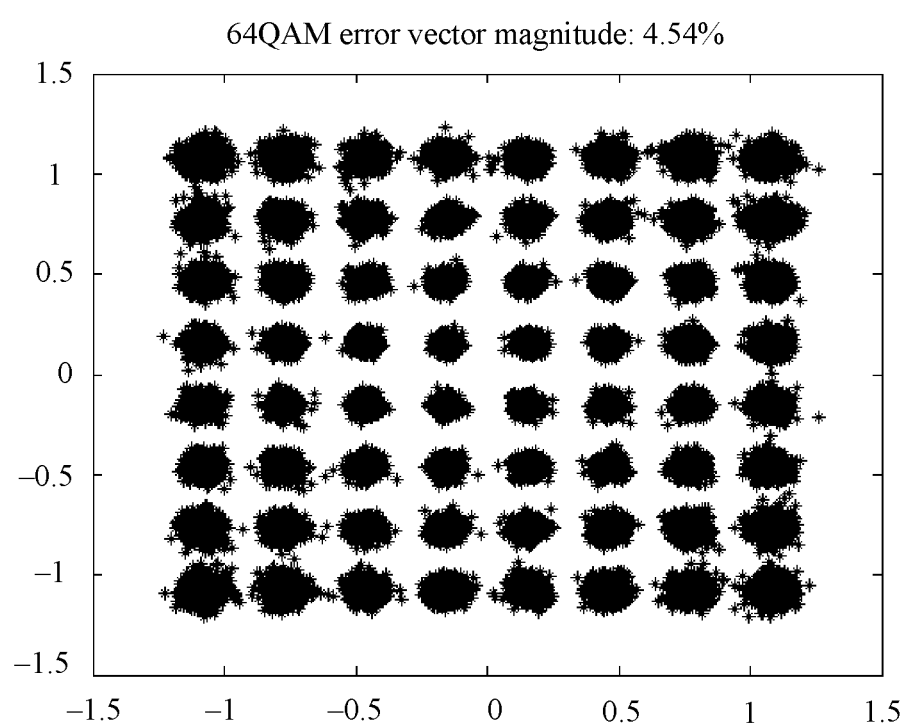
FIG. 10C is a constellation diagram obtained by using a 64QAM modulation scheme in a method according to an embodiment of the present invention.

It is assumed that a target peak-to-average ratio is set to 6 dB. After iteration is performed for three times by using the method provided in this embodiment of the present invention, a peak-to-average ratio is decreased from 9.62 dB to 6.18 dB, as shown in FIG. 9. From a perspective of EVM, for an output signal, an obtained EVM of a data symbol modulated by using 64QAM is 4.54% (as shown in a constellation diagram in FIG. 10A); an obtained EVM of a data symbol modulated by using 16QAM is 8.61% (as shown in a constellation diagram in FIG. 10B); and an obtained EVM of a data symbol modulated by using QPSK is 11.92% (as shown in a constellation diagram in FIG. 10C). In this case, it can be learned from the constellation diagrams that after clipping processing is performed by using the method provided in this embodiment of the present invention, EVMs of data symbols modulated by using the QPSK, the 16QAM, and the 64QAM are different, but the data symbols may be properly demodulated. It can be learned that, by using the method provided in this embodiment of the present invention, a peak-to-average ratio of a signal is further decreased while proper demodulation of a data symbol is ensured.

Figure 11:
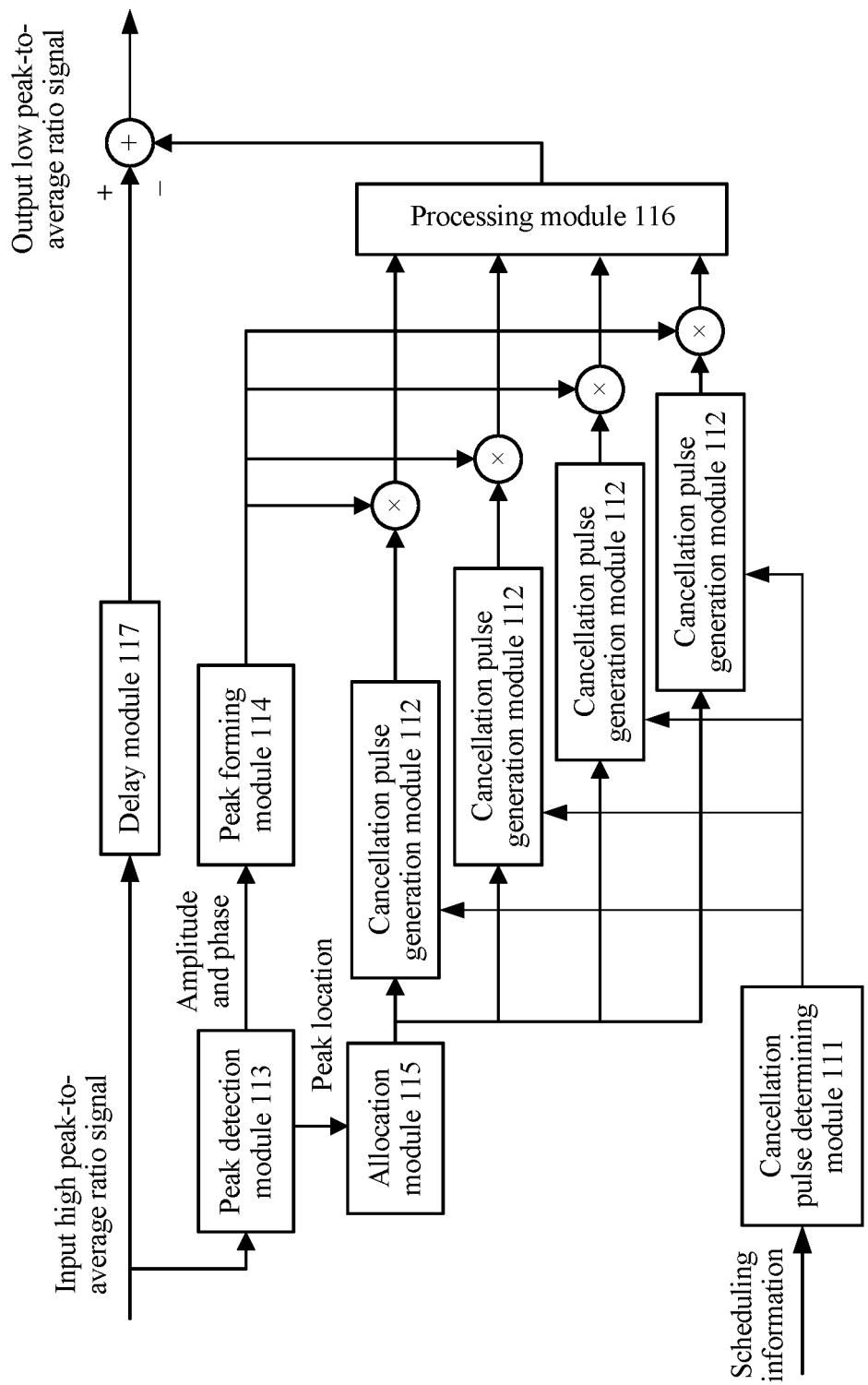
FIG. 11 is a schematic diagram of a first communications device according to an embodiment of the present invention.

Based on a same invention concept, an embodiment of the present invention further provides a communications device. As shown in FIG. 11, the communications device includes a cancellation pulse determining module 111, configured to: determine, according to scheduling information of a BBU, a cancellation pulse sequence, and send the cancellation pulse sequence to each cancellation pulse generation module 112 for storing, where the scheduling information is used to indicate a modulation scheme used when each resource block for transmitting an input signal is used to transmit a data symbol, a peak detection module 113, configured to perform peak detection on the input signal, so as to obtain amplitude information, phase information, and location information of a peak signal of the input signal, a peak forming module 114, configured to obtain, according to amplitude information and phase information of each peak signal, a peak forming factor that is corresponding to each peak signal and that is used to adjust an amplitude and/or a phase of a cancellation pulse sequence corresponding to the peak signal, an allocation module 115, configured to separately send location information of each peak signal to a corresponding cancellation pulse generation module, a cancellation pulse generation module 112, configured to separately output, according to the location information of each peak signal, a corresponding cancellation pulse sequence, and a processing module 116, configured to: calculate a sum of products of peak forming factors corresponding to all peak signals and cancellation pulse sequences corresponding to all the peak signals, so as to obtain a clipping noise; and use a difference between the input signal and the clipping noise as a signal obtained after clipping processing.

According to the communications device provided in this embodiment of the present invention, a cancellation pulse sequence is determined according to scheduling information of a BBU, and the scheduling information is used to indicate a modulation scheme used when each resource block for transmitting an input signal is used to transmit a data symbol, that is, the cancellation pulse sequence is determined according to the modulation scheme used when each resource block for transmitting the input signal is used to transmit a data symbol. In this way, after clipping processing is performed by using the cancellation pulse sequence, EVM losses of data obtained by using different modulation schemes are different, so as to meet EVM requirements of different modulation schemes while proper demodulation of data is ensured. Therefore, a peak-to-average ratio of a signal obtained after the clipping processing is lower, thereby further improving efficiency of a power amplifier.

In this embodiment, the communications device further includes: a delay module 117, configured to perform delay processing on the input signal, and the processing module 116 is specifically configured to use a difference between an input signal obtained after the delay processing and the clipping noise as the signal obtained after the clipping processing.

In this embodiment, the peak forming module 114 obtains, by using the following formula, a peak forming factor corresponding to the peak signal:

$$\alpha = (|x| - \gamma) \times \exp(j\theta)$$

where $\alpha$ is the peak forming factor, $|x|$ is the amplitude information of the peak signal, $\gamma$ is a set clipping threshold, and $\theta$ is the phase information of the peak signal.

Based on any one of the foregoing embodiments, the cancellation pulse determining module 111 is specifically configured to determine, according to the scheduling information, a modulation scheme used when each resource block is used to transmit a data symbol; determine, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block; and add up determined cancellation pulse sub-sequences corresponding to all resource blocks, so as to obtain the cancellation pulse sequence.

Further, the cancellation pulse determining module 111 is further configured to, when the scheduling information changes, redetermine the cancellation pulse sequence according to updated scheduling information, and send the redetermined cancellation pulse sequence to each cancellation pulse generation module for updating.

Based on any one of the foregoing embodiments, if clipping processing is performed for the first time, the input signal is a baseband signal from the BBU; or if clipping processing is performed for the second time or a subsequent time, the input signal is a signal obtained after previous clipping processing.

Figure 12:
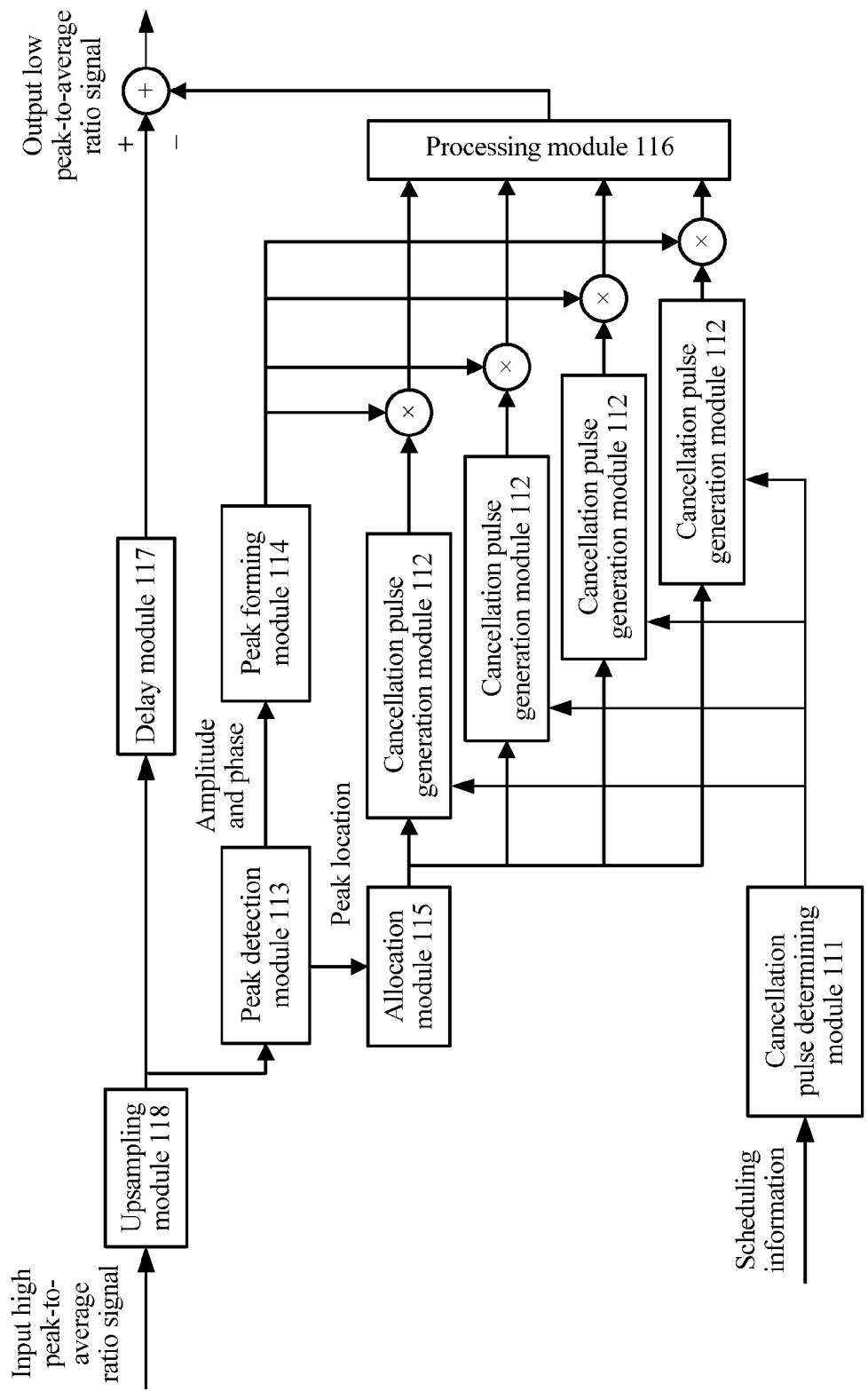
FIG. 12 is a schematic diagram of a second communications device according to an embodiment of the present invention.

Based on any one of the foregoing embodiments, if the communications device is an RRU, as shown in FIG. 12, the communications device further includes an upsampling module 118 that is connected to the peak detection module 113, configured to: perform upsampling processing on a received input signal, and input a signal obtained after the upsampling processing to the peak detection module 113 as an input signal of the peak detection module 113.

Figure 13:
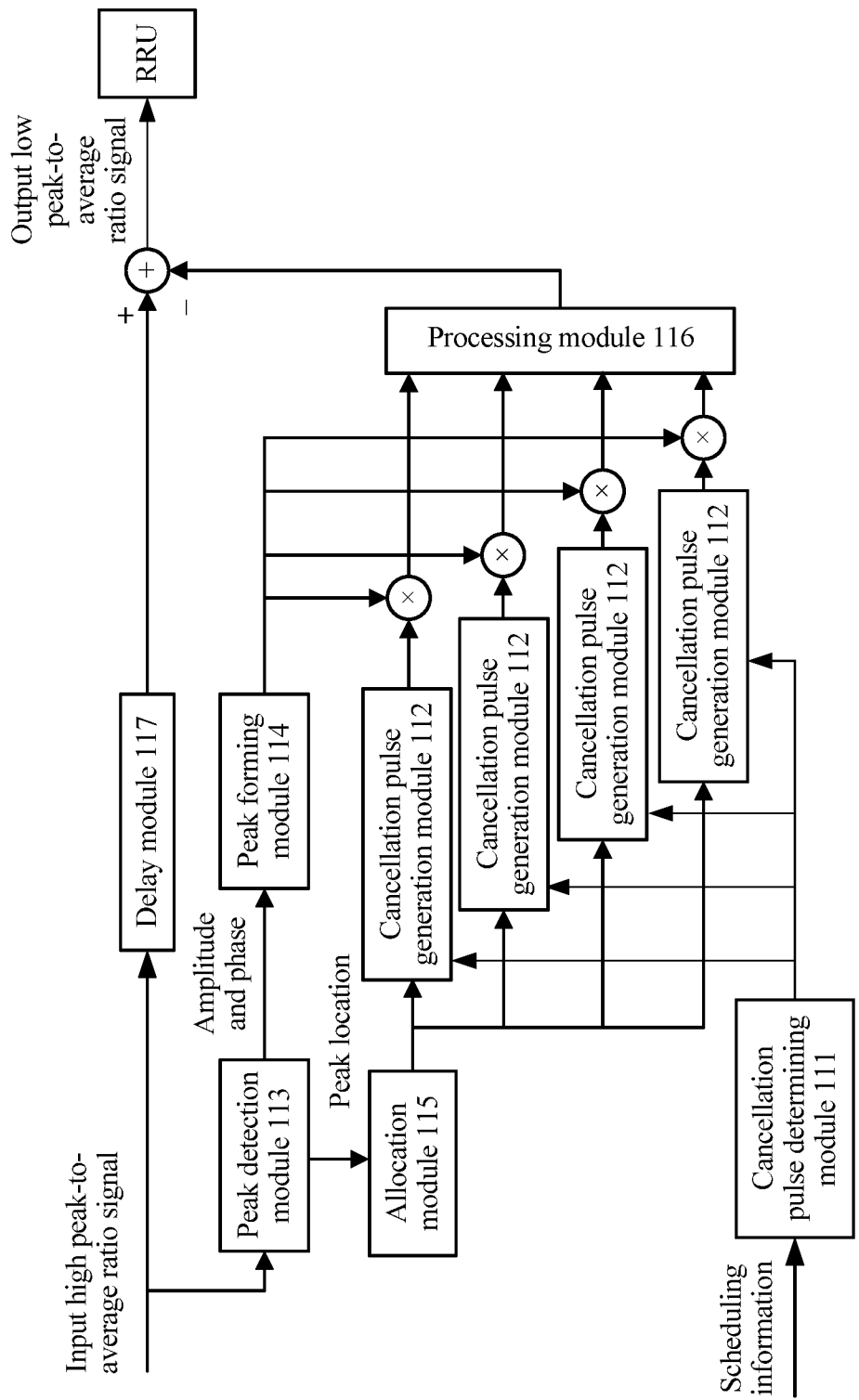
FIG. 13 is a schematic diagram of a third communications device according to an embodiment of the present invention.

Based on any one of the foregoing embodiments, if the communications device is the BBU, as shown in FIG. 13, the processing module 116 is further configured to send the signal obtained after the clipping processing to an RRU for performing upsampling processing and intermediate frequency clipping processing.

It should be noted that functions of all modules in the foregoing communications devices provided in this embodiment of the present invention may be implemented by using specific design of a circuit.

Figure 14:
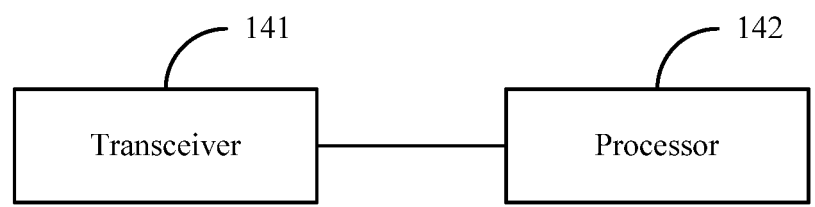
FIG. 14 is a schematic diagram of a fourth communications device according to an embodiment of the present invention.

Based on a same invention concept, an embodiment of the present invention further provides a communications device. As shown in FIG. 14, the communications device includes a transceiver 141, configured to receive an input signal, and a processor 142, configured to: determine a cancellation pulse sequence according to scheduling information of a BBU, where the scheduling information is used to indicate a modulation scheme used when each resource block for transmitting an input signal is used to transmit a data symbol, perform peak detection on the input signal, so as to obtain amplitude information, phase information, and location information of a peak signal of the input signal, obtain, according to amplitude information and phase information of each peak signal, a peak forming factor that is corresponding to each peak signal and that is used to adjust an amplitude and/or a phase of a cancellation pulse sequence corresponding to the peak signal; separately send location information of each peak signal to a corresponding cancellation pulse generator; separately output, according to the location information of each peak signal, a corresponding cancellation pulse sequence; and calculate a sum of products of peak forming factors corresponding to all peak signals and cancellation pulse sequences corresponding to all the peak signals, so as to obtain a clipping noise, use a difference between the input signal and the clipping noise as a signal obtained after clipping processing, and output, by using the transceiver 141, the signal obtained after the clipping processing.

In this embodiment, the processor 142 is further configured to perform delay processing on the input signal, and the processor 142 is specifically configured to use a difference between an input signal obtained after the delay processing and the clipping noise as the signal obtained after the clipping processing.

In this embodiment, the processor 142 obtains, by using the following formula, a peak forming factor corresponding to the peak signal:

$$\alpha = (|x| - \gamma) \times \exp(j\theta)$$

where $\alpha$ is the peak forming factor, $|x|$ is the amplitude information of the peak signal, $\gamma$ is a set clipping threshold, and $\theta$ is the phase information of the peak signal.

Based on any one of the foregoing embodiments, the processor 142 is specifically configured to determine, according to the scheduling information, a modulation scheme used when each resource block is used to transmit a data symbol; determine, according to an order of the modulation scheme used when each resource block is used to transmit a data symbol, a cancellation pulse sub-sequence corresponding to each resource block, where a higher order of a modulation scheme used when the resource block is used to transmit a data symbol indicates a smaller amplitude-frequency response that is of a cancellation pulse sub-sequence corresponding to the resource block and that is on a frequency band occupied by the resource block; and add up determined cancellation pulse sub-sequences corresponding to all resource blocks, so as to obtain the cancellation pulse sequence.

Further, the processor 142 is configured to, when the scheduling information changes, redetermine the cancellation pulse sequence according to updated scheduling information, and send the redetermined cancellation pulse sequence to each cancellation pulse generation module for updating.

Based on any one of the foregoing embodiments, if clipping processing is performed for the first time, the input signal is a baseband signal from the BBU; or if clipping processing is performed for the second time or a subsequent time, the input signal is a signal obtained after previous clipping processing.

Based on any one of the foregoing embodiments, if the communications device is an RRU, the processor 142 is further configured to perform upsampling processing on a received input signal, and use a signal obtained after the upsampling processing as the input signal for performing the peak detection.

Based on any one of the foregoing embodiments, if the communications device is the BBU, the transceiver 141 is further configured to send the signal obtained after the clipping processing to an RRU for performing upsampling processing and intermediate frequency clipping processing.

A person skilled in the art should understand that the embodiments of the present invention may be provided as a method, a system, or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A signal clipping processing method, comprising:
   performing peak detection on an input signal, so as to obtain amplitude information, phase information, and location information of a peak signal of one or more peak signals of the input signal;
   obtaining, according to amplitude information and phase information of each peak signal of the one or more peak signals, a peak forming factor that corresponds to the respective peak signal and that is used to adjust at least one of an amplitude or a phase of a cancellation pulse sequence corresponding to the respective peak signal;
   outputting, separately and according to location information of each peak signal, the cancellation pulse sequence, wherein the cancellation pulse sequence is determined according to scheduling information of a baseband unit (BBU), and wherein the scheduling information indicates a modulation scheme used when each resource block of a plurality of resource blocks for transmitting the input signal is used to transmit a data symbol; and
   calculating a sum of products of peak forming factors corresponding to all peak signals and cancellation pulse sequences corresponding to all the peak signals so as to obtain a clipping noise, and using a difference between the input signal and the clipping noise as a signal obtained after clipping processing.

2. The method according to claim 1, wherein the method further comprises: performing delay processing on the input signal; and
   wherein the using the difference between the input signal and the clipping noise as the signal obtained after clipping processing comprises using a difference between an input signal obtained after the delay processing and the clipping noise as the signal obtained after the clipping processing.

3. The method according to claim 1, wherein a peak forming factor corresponding to the peak signal is obtained according to the amplitude information and the phase information of the peak signal, and according to:

$$\alpha=(|x|-\gamma)\times\exp(j\theta)$$

wherein α is the peak forming factor, |x| is the amplitude information of the peak signal, γ is a set clipping threshold, and θ is the phase information of the peak signal.

4. The method according to claim 1, further comprising determining the cancellation pulse sequence according to the scheduling information, wherein the determining the cancellation pulse sequence comprises:
  determining, according to the scheduling information, a modulation scheme used when each resource block is used to transmit a data symbol;
  determining, according to an order of the modulation scheme used when each resource block is used to transmit a data symbol, a cancellation pulse sub-sequence corresponding to each resource block, wherein a higher order of the modulation scheme used when the respective resource block is used to transmit a data symbol indicates a smaller amplitude-frequency response that is of a cancellation pulse sub-sequence corresponding to the respective resource block and that is on a frequency band occupied by the respective resource block; and
  adding up determined cancellation pulse sub-sequences corresponding to all resource blocks so as to obtain the cancellation pulse sequence.

5. The method according to claim 4, wherein determining the cancellation pulse sequence according to the scheduling information comprises:
  redetermining, when the scheduling information changes, the cancellation pulse sequence according to updated scheduling information.

6. The method according to claim 1, wherein the input signal is at least one of a baseband signal from the BBU or a signal obtained after previous clipping processing.

7. The method according to claim 1, the method further comprises performing, before the performing peak detection on an input signal, upsampling processing on a received input signal, and using a signal obtained after the upsampling processing as the input signal for performing the peak detection.

8. A communications device, comprising:
  a processor; and
  a non-transitory computer-readable storage medium storing a program to be executed by the processor, the program including instructions to:
    determine, according to scheduling information of a baseband unit (BBU), a cancellation pulse sequence, and store the cancellation pulse sequence, wherein the scheduling information indicates a modulation scheme used when each resource block that is of a plurality of resource blocks and that is used for transmitting an input signal is used to transmit a data symbol;
    perform peak detection on the input signal, so as to obtain amplitude information, phase information, and location information of a peak signal of one or more peak signals of the input signal;
    obtain, according to amplitude information and phase information of each peak signal of the one or more peak signals, a peak forming factor that corresponds to the respective peak signal and that is used to adjust an amplitude and/or a phase of that is of the cancellation pulse sequence and that corresponds to the respective peak signal;
    generate and output, separately and according to the location information of each peak signal of the one or more peak signals, the cancellation pulse sequence; and
    calculate a sum of products of peak forming factors corresponding to all peak signals of the one or more peak signals and the cancellation pulse sequence corresponding to all of the peak signals of the one or more peak signals, so as to obtain a clipping noise, and use a difference between the input signal and the clipping noise as a signal obtained after clipping processing.

9. The communications device according to claim 8, wherein the program further includes instructions to perform delay processing on the input signal; and
  wherein the instructions to calculate the sum of products of the peak forming factors include instructions to use a difference between an input signal obtained after the delay processing and the clipping noise as the signal obtained after the clipping processing.

10. The communications device according to claim 8, wherein the instructions to obtain the peak forming factor include instructions to obtain, a peak forming factor corresponding to the peak signal and determine according to:

$$\alpha=(|x|-\gamma)\times\exp(j\theta)$$

wherein α is the peak forming factor, |x| is the amplitude information of the peak signal, γ is a set clipping threshold, and θ is the phase information of the peak signal.

11. The communications device according to claim 8, wherein the instructions to determine the cancellation pulse sequence and store the cancellation pulse sequence include instructions to:
  determine, according to the scheduling information, a modulation scheme used when each resource block is used to transmit a data symbol;
  determine, according to an order of the modulation scheme used when each resource block is used to transmit a data symbol, a cancellation pulse sub-sequence corresponding to each resource block, wherein a higher order of a modulation scheme used when the respective resource block is used to transmit a data symbol indicates a smaller amplitude-frequency response that is of a cancellation pulse sub-sequence corresponding to the respective resource block and that is on a frequency band occupied by the respective resource block; and
  add up the determined cancellation pulse sub-sequences corresponding to all resource blocks so as to obtain the cancellation pulse sequence.

12. The communications device according to claim 11, wherein the instructions to determine the cancellation pulse sequence and store the cancellation pulse sequence further include instructions to:
  redetermine, when the scheduling information changes, the cancellation pulse sequence according to updated scheduling information.

13. The communications device according to claim 8, wherein the input signal is at least one of a baseband signal from the BBU, or a signal obtained after previous clipping processing.

14. The communications device according to claim 8, wherein the communications device is a remote radio unit (RRU), and wherein the program further includes instructions to:
  perform upsampling processing on a received input signal; and
  use a signal obtained after the upsampling processing as the input signal.

15. The communications device according to claim 8, the communications device is the BBU, and wherein the instructions to calculate the sum of products of the peak forming factors include instructions to:
  send the signal obtained after the clipping processing for upsampling processing and intermediate frequency clipping processing.

16. A communications device, wherein the communications device comprises:
  a transceiver;
  a processor connected to the transceiver; and
  a non-transitory computer-readable medium storing program modules executable by the processor, the modules including:
    a plurality of cancellation pulse generation modules;
    a cancellation pulse determining module, configured to determine, according to scheduling information of a baseband unit (BBU), a cancellation pulse sequence, and send the cancellation pulse sequence to each cancellation pulse generation module of the plurality of cancellation pulse generation modules for storing, wherein the scheduling information indicates a modulation scheme used when each resource block that is of a plurality of resource blocks and that is used for transmitting an input signal through the transceiver is used to transmit a data symbol;
    a peak detection module, configured to perform peak detection on the input signal, so as to obtain amplitude information, phase information, and location information of a peak signal of one or more peak signals of the input signal;
    a peak forming module, configured to obtain, according to amplitude information and phase information of each peak signal of the one or more peak signals, a peak forming factor that corresponds to the respective peak signal and that is used to adjust an amplitude and/or a phase that is of the cancellation pulse sequence and that corresponds to the respective peak signal;
    an allocation module, configured to separately send location information of each peak signal to a corresponding cancellation pulse generation module of the plurality of cancellation pulse generation modules, wherein each cancellation pulse generation module of the plurality of cancellation pulse generation modules is configured to separately output, according to the location information of each peak signal of the one or more peak signals, the cancellation pulse sequence; and
    a processing module, configured to calculate a sum of products of peak forming factors corresponding to all peak signals of the one or more peak signals and the cancellation pulse sequence corresponding to all of the peak signals of one or more peak signals, so as to obtain a clipping noise, and to use a difference between the input signal and the clipping noise as a signal obtained after clipping processing.

17. The communications device according to claim 16, wherein the communications device further comprises a delay module configured to perform delay processing on the input signal; and
  wherein the processing module is further configured to use a difference between an input signal obtained after the delay processing and the clipping noise as the signal obtained after the clipping processing.

18. The communications device according to claim 16, wherein the peak forming module obtains a peak forming factor corresponding to the peak signal according to:

$$\alpha = (|x| - \gamma) \times \exp(j\theta)$$

wherein $\alpha$ is the peak forming factor, $|x|$ is the amplitude information of the peak signal, $\gamma$ is a set clipping threshold, and $\theta$ is the phase information of the peak signal.

19. The communications device according to claim 16, wherein the cancellation pulse determining module is further configured to:
  determine, according to the scheduling information, a modulation scheme used when each resource block is used to transmit a data symbol;
  determine, according to an order of the modulation scheme used when each resource block is used to transmit a data symbol, a cancellation pulse sub-sequence corresponding to each resource block, wherein a higher order of a modulation scheme used when the resource block is used to transmit a data symbol indicates a smaller amplitude-frequency response that is of a cancellation pulse sub-sequence corresponding to the resource block and that is on a frequency band occupied by the resource block; and
  add up determined cancellation pulse sub-sequences corresponding to all resource blocks, so as to obtain the cancellation pulse sequence.

20. The communications device according to claim 19, wherein the cancellation pulse determining module is further configured to:
  redetermine the cancellation pulse sequence when the scheduling information changes, and according to updated scheduling information; and
  send the redetermined cancellation pulse sequence to each cancellation pulse generation module for updating.

* * * * *